United States Patent
Sennhauser et al.

(10) Patent No.: US 9,779,145 B2
(45) Date of Patent: Oct. 3, 2017

(54) VARIABLE RESULT SET SIZE BASED ON USER EXPECTATION

(71) Applicant: Nektoon AG, Zürich (CH)

(72) Inventors: Alexander Sennhauser, Zürich (CH); Felix Hürlimann, Zürich (CH)

(73) Assignee: NEKTOON AG, Zürich (CH)

( * ) Notice: Subject to any disclaimer, the term of this patent is extended or adjusted under 35 U.S.C. 154(b) by 299 days.

(21) Appl. No.: 14/603,665

(22) Filed: Jan. 23, 2015

(65) Prior Publication Data

US 2015/0213025 A1    Jul. 30, 2015

Related U.S. Application Data

(60) Provisional application No. 61/931,013, filed on Jan. 24, 2014.

(51) Int. Cl.
*G06F 17/30* (2006.01)

(52) U.S. Cl.
CPC .... *G06F 17/3053* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 7,716,223 B2 | 5/2010 | Haveliwala | |
| 7,783,620 B1* | 8/2010 | Chevalier | G06F 17/3053 707/706 |
| 8,996,487 B1* | 3/2015 | Pasupathy | G06F 17/301 707/705 |
| 9,092,510 B1* | 7/2015 | Stets, Jr. | G06F 17/30648 |
| 2003/0233345 A1 | 12/2003 | Perisic | |
| 2007/0179930 A1* | 8/2007 | Wang | G06F 17/30864 |
| 2009/0210371 A1* | 8/2009 | Laan | G06K 9/6292 706/21 |
| 2011/0131241 A1* | 6/2011 | Petrou | G06F 17/30861 707/770 |
| 2011/0270828 A1* | 11/2011 | Varma | G06F 17/30864 707/728 |
| 2012/0185473 A1* | 7/2012 | Ponting | G06F 17/30861 707/728 |
| 2013/0204859 A1* | 8/2013 | Vijaywargi | G06F 17/30867 707/709 |

(Continued)

*Primary Examiner* — Hung Le

(57) ABSTRACT

An information retrieval system includes computing hardware, a database operatively coupled with the computing hardware and including documents for delivery to a user in response to a user search as well as a non-transitory, computer-readable memory component operatively coupled with the computing hardware. The non-transitory, computer-readable memory component further includes a receiving module configured to, upon actuation by the computing hardware, receive a search query and a corresponding relevancy expectation score from the user; a search module configured to, upon actuation by the computing hardware, search the database against the search query provided by the user and output an original list of results each of which exhibits a numerical score; and a post-processing module configured to, upon actuation by the computing hardware, perform post-processing of the numerical scores of the results of the original list.

16 Claims, 9 Drawing Sheets

(56) References Cited

U.S. PATENT DOCUMENTS

2014/0257794 A1* 9/2014 Gandrabur .......... G10L 15/1815
  704/9
2014/0258285 A1* 9/2014 Lavine .............. G06F 17/30554
  707/728

* cited by examiner

VARIABLE RESULT SET SIZE BASED ON USER EXPECTATION

TECHNICAL FIELD

The present invention relates generally to information retrieval systems, and more specifically, to a system and method for adjusting search result set size based on user provided expectation.

BACKGROUND

The process of information retrieval involves two parties. On one hand there are producers of the information to be stored by the information retrieval system. The producers either actively publish the information to the system or let the information system select the information from the producer's source system (e.g. internet search engines work that way). On the other hand there are consumers of the information stored in the information retrieval system. Examples of published and stored information types, include, but are not limited to, social media messages, digitized documents (e.g. scanned and converted with optical character recognition), electronic message documents (e-mails), images, HTML pages, binary documents such as office documents, and text documents.

Information retrieval systems work by extracting information out of a source document and storing the corresponding document representation for later retrieval. The representation of a document is composed in parts of meta-data associated with the source document (data describing the source document) and data from the actual document content. Examples of meta data attributes, include, but are not limited to, document author name, document author social media platform identifier (e.g. twitter handle), document creation date, document modification date, length of document in number of bytes, length of document in number of characters, length of document in number of words, document domain (e.g. dietary publication in the field of medicine), and document content attributes (e.g. age group studied in the dietary publication).

Consumers of the system formulate queries that are formal statements of information needed. Queries are formulated by using arbitrary text keywords and, or, specific parts from the document meta-data. Examples of query terms, include, but are not limited to, individual text keywords, text phrases, meta-data attribute filters, and meta-data attribute range filters. The information retrieval system evaluates each query and locates matching document representations, with varying levels of relevance. The corresponding documents are returned to the user. The information retrieval system may also calculate the level of relevancy of each document representation and sort the returned documents according to the respective relevancy level.

One reason for the broad adaption of information retrieval systems is the large amount of digital information available. Technologies such as the public Internet, electronic messaging systems (e-mail), social media networks, and mobile devices allow producers to publish information more easily and thus more frequently. All resulting in an exponential digital information growth. On the consumer side information overload is a wide spread problem. There is too much information to be processed, thus consumers need tools to efficiently navigate through the information available and find the sub-set of information that satisfies their information need.

However, a typical information retrieval system may overwhelm the user with the result set returned for any given query. The result set may include a large number of results, making it difficult and time consuming for the user to comprehend the relevant results. The user may limit the number of search results by narrowing down the search query. However, the narrowed search query may not yield some results, which would otherwise be relevant.

Attempts have been made to improve the relevancy of the results of a search query based on relative expertise between a searcher (consumer) and the creator(s) and/or contributor(s) (producers) of a document. Personalized rankings of search results have also been provided. However, neither of these techniques has been proven to be very efficient in reducing the size of the result set and increasing the probability of relevant results, without narrowing down the search query.

There is a need for an information retrieval system that enables a user to limit the number of search results without narrowing down the search query.

SUMMARY

The present disclosure seeks to provide an information retrieval system and a method of operating the information retrieval system for processing a search query.

In one aspect, embodiments of the present disclosure provide an information retrieval system that includes computing hardware operable to execute one or more software products recorded on machine-readable data storage media. The computing hardware is operable to receive from a user device, a search query and a corresponding relevancy expectation score, and search a database against the search query and generate a first list of results, wherein each result of the first list has a numeric score associated therewith. The computing hardware is further operable to transform the relevancy expectation score with a polynomial function, wherein the order of the polynomial function depends on the number of results in the first list, to (i) determine a volume regulation function by fitting a natural language specific distribution to the numeric scores of the first list, and (ii) to estimate a cut-off score from a transformed relevancy expectation score and total number of results in the first list, using the determined volume regulation function. The computing hardware is furthermore operable to generate a filtered list based on the cut-off score, wherein the filtered list includes one or more results of the first list that have a numeric score greater than or equal to the cut-off score.

In an embodiment of the present invention, the computing hardware is further operable to cap the cut-off score using a pre-calculated minimal score.

In an embodiment of the present invention, the computing hardware is further operable to use a fall-back method to estimate the result set size based on user expectation if the volume regulation function cannot be determined.

In an embodiment of the present invention, the computing hardware is further operable to sort one or more results of the filtered list according to respective timestamps.

In an embodiment of the present invention, the computing hardware is further operable to use a sub-set of the first list for computing the cut-off score, wherein the sub-set includes relevant results.

The user device is implemented using at least one of: a personal computer, a laptop, a personal digital assistant, a tablet, a phablet, a webpad, a wearable computer, a mobile telephone, a wrist-worn computer, and a smart phone.

In another aspect, embodiments of the present disclosure provide a computer implemented method of varying result set size during information retrieval based upon user expectations, which method includes the actions of receiving a search query and a corresponding relevancy expectation score from a user device searching a database against the received search query and generating a first list of one or more results, wherein each result of the first list has a numeric score associated therewith.

In an embodiment of the present disclosure, the method further includes transforming the relevancy expectation score with a polynomial function, wherein the order of the polynomial function depends on the number of results in the first list; fitting a natural language specific distribution to the numeric scores of the one or more results of the first list to determine a volume regulation function; using the determined volume regulation function to estimate a cut-off score from the transformed relevancy expectation score and the total number of results in the first list; and generating a filtered list including results of the first list having a numeric score greater than or equal to the cut-off score.

In an embodiment of the present disclosure, the method also further includes applying a fall-back method to calculate a result set size based on a relevancy expectation value and the original result set size.

In an embodiment of the present disclosure, the method also further includes capping the cut-off score using a pre-calculated minimal score.

In an embodiment of the present disclosure, the method also further includes computing the cut-off score with a sub-set of the first list, wherein the sub-set includes one or more relevant results.

In an embodiment of the present disclosure, the method also further includes sorting one or more results of the filtered list according to respective timestamps.

In an embodiment of the present disclosure, receiving a search query and a corresponding relevancy expectation score from a user device may include receiving the search query from at least one of: a personal computer, a laptop, a personal digital assistant, a tablet, a phablet, a webpad, a wearable computer, a mobile telephone, a wrist-worn computer, and a smart phone.

In yet another aspect, embodiments of the present disclosure provide an information retrieval system including computing hardware, a database operatively coupled with the computing hardware and including documents for delivery to a user in response to a user search and a non-transitory, computer-readable memory component operatively coupled with the computing hardware. The memory component further includes a receiving module configured to, upon actuation by the computing hardware, receive a search query and a corresponding relevancy expectation score from the user; a search module configured to, upon actuation by the computing hardware, search the database against the search query provided by the user and output an original list of results each of which exhibits a numerical score; and a post-processing module configured to, upon actuation by the computing hardware, perform post-processing of the numerical scores of the results of the original list.

In an embodiment of the present disclosure, the post-processing module is further configured to, upon actuation by the computing hardware, transform a relevancy expectation score, determine a volume regulation function and estimate a cut-off score.

In an embodiment of the present disclosure, the information retrieval system a further includes a result set filtering module configured to, upon actuation by the computing hardware, filter the results of the original list based on the cut-off score.

In an embodiment of the present disclosure, the information retrieval system further includes a result set sorting module configured to, upon actuation by the computing hardware, sort the filtered results based on respective timestamps.

In an embodiment of the present disclosure, the information retrieval system further includes an output module configured to, upon actuation by the computing hardware, transmit the sorted list of results to the user.

Further details of aspects, objects, and advantages of the invention are described below in the detailed description, figures, and claims. Both the foregoing general description and the following detailed description are exemplary and explanatory, and are not intended to be limiting as to the scope of the invention.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

The following detailed description illustrates embodiments of the present disclosure and manners by which they can be implemented. Although the best mode of carrying out the present disclosure has been disclosed, those skilled in the art would recognize that other embodiments for carrying out or practicing the present disclosure are also possible.

Embodiments of the present disclosure provide an information retrieval system that includes computing hardware operable to execute one or more software products recorded on machine-readable data storage media. The computing hardware is operable to receive from a user device, a search query and a corresponding relevancy expectation score, and search a database against the search query and generate a first list of results, wherein each result of the first list has a numeric score associated therewith. The computing hardware is further operable to transform the relevancy expectation score with a polynomial function, wherein the order of the polynomial function depends on the number of results in the first list, to determine a volume regulation function by fitting a natural language specific distribution to the numeric scores of the first list, and to estimate a cut-off score from a transformed relevancy expectation score and total number of results in the first list, using the determined volume regulation function. The computing hardware is furthermore operable to generate a filtered list based on the cut-off score, wherein the filtered list includes one or more results of the first list that have a numeric score greater than or equal to the cut-off score.

Embodiments of the present disclosure substantially eliminate, or at least partially address, problems in the prior art and enable the user to limit the number of search results without narrowing down the search query.

Figure 1:
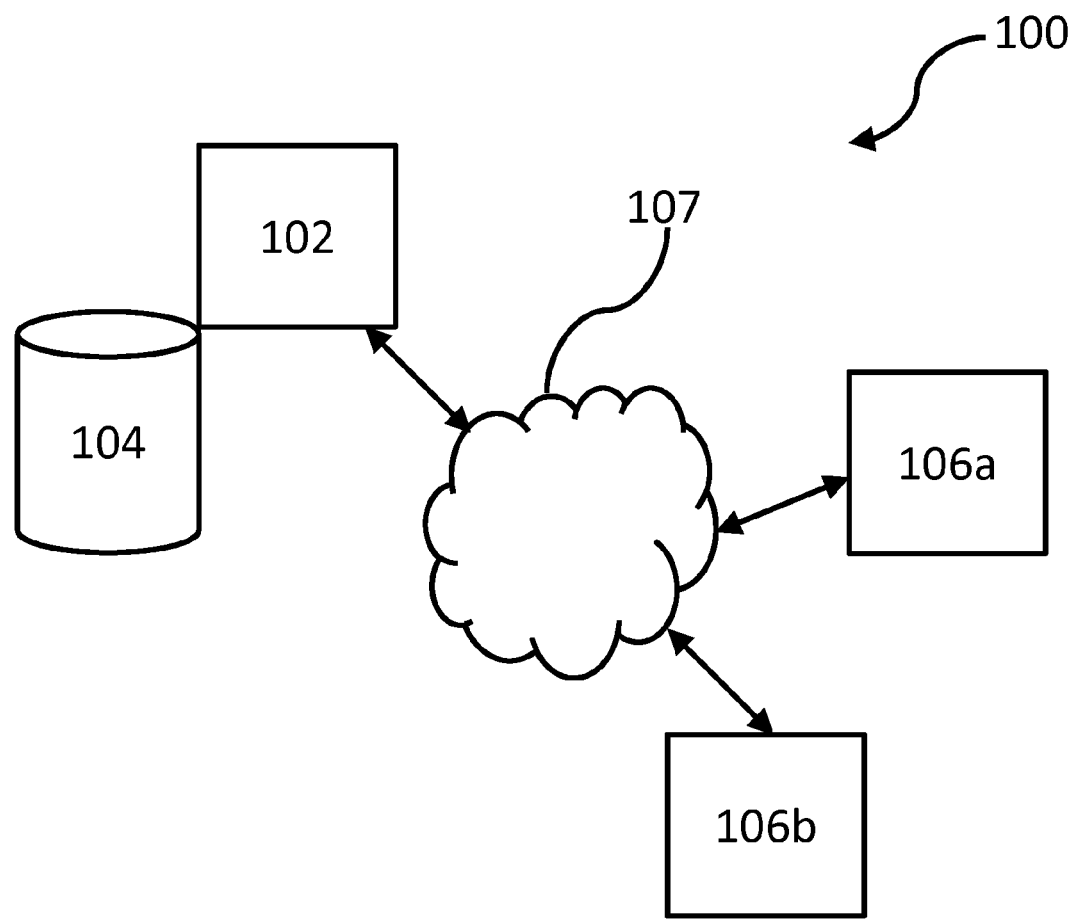
FIG. 1 is a schematic illustration of an environment, wherein various embodiments of the present invention can be practiced.

Referring now to the drawings, particularly by their reference numbers, FIG. 1 is an illustration of an environment 100, wherein various embodiments of the present invention can be practiced. The environment 100 includes an information retrieval system 102, at least one database 104, and one or more user devices 106a and 106b, wherein the information retrieval system 102, the database 104, and the one or more user devices 106a and 106b are communicatively coupled to each other via a communication network 107. Examples of the communication network 107 include, but are not limited to, Internet, Intranet, MAN, LAN, and WAN.

The information retrieval system 102 generally includes one or more servers that serve data to the user devices 106a and 106b, in the form of webpages that may include redirects and other Hypertext mark-up language (HTML) information such as text, figures, videos, images, and scripts. The user devices 106a and 106b are generally representative of user computing devices such as personal computers, laptops, personal digital assistants, tablets, phablets, webpads, wearable computers, mobile telephones, wrist-worn computers, smart phones or any other devices capable of displaying a web-based interface or using a application programming interface (API) for communicating with the information retrieval system 102.

The database 104 stores a plurality of documents, images, videos, figures, scripts pertaining to a variety of topics such as finance, literature, science, healthcare, legal, etc. In an example, the database 104 is the World Wide Web. In an embodiment, the information retrieval system 102 includes a search engine that is configured to receive and process one or more queries against the database 104. In another embodiment, the information retrieval system 102 executes a web page on a display of the user device 106a, that includes a search section for inputting one or more search queries, and a display section for displaying one or more search results based on the one or more search queries.

FIG. 1 is merely an example. One of ordinary skill in the art would recognize many variations, alternatives, and modifications of embodiments herein.

Figure 2:
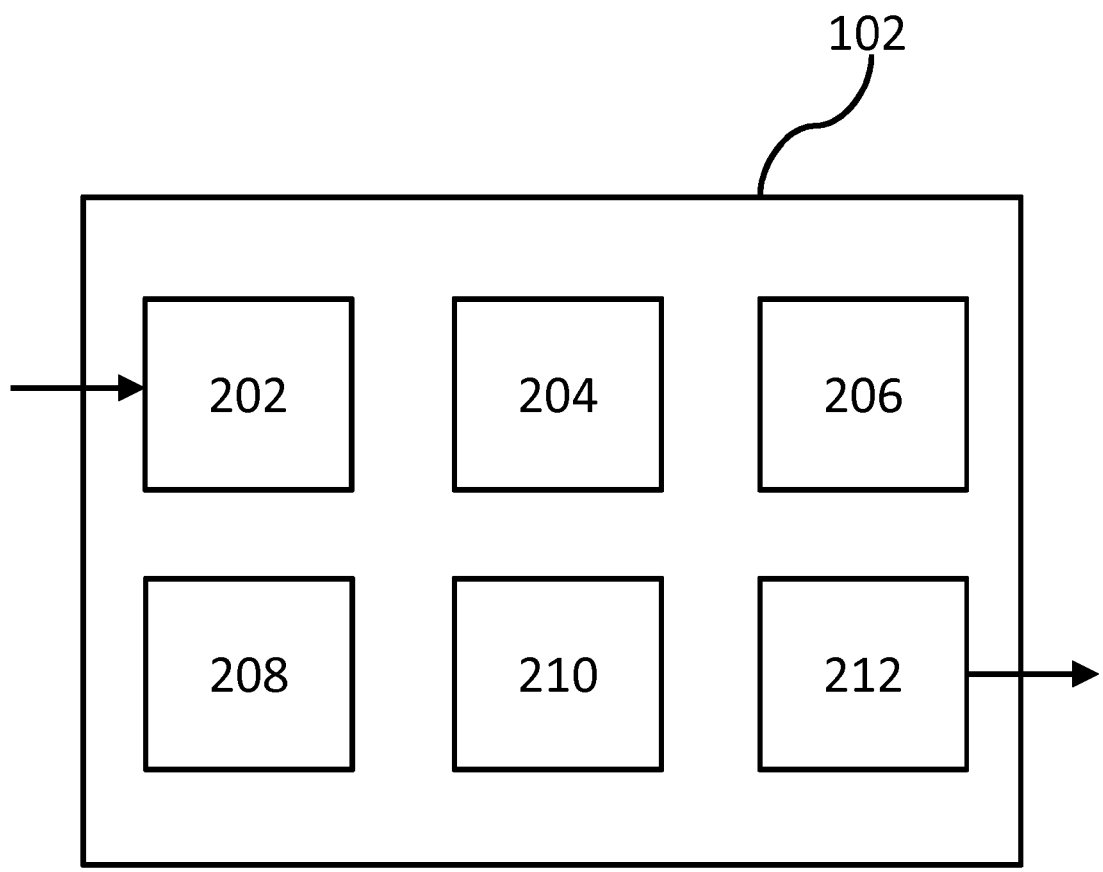
FIG. 2 is a schematic illustration of an information retrieval system, in accordance with an embodiment of the present disclosure.

FIG. 2 is a schematic illustration of the information retrieval system 102, in accordance with an embodiment of the present disclosure. The information retrieval system 102 includes a receiving module 202, a search module 204, a post-processing module 206, a result set filtering module 208, a result set sorting module 210, and an output module 212.

The receiving module 202 is configured to receive a search query and a corresponding relevancy expectation score from a user. In an exemplary embodiment, the relevancy expectation score is a numerical value ranging from 1.0 (highest relevancy expectation score) to 0.0 (lowest relevancy expectation score). The relevancy expectation score for a search query indicates the user's expectation on the relevancy of the results from the search query. If the relevancy expectation score is high, the user expects a small number of results from the search query and all the results may be relevant. If the relevancy expectation score is low, the user expects a large number of results from the query, out of which few results may be relevant. The low relevancy expectation score indicates large number of irrelevant search results in a result set, and thus, a more noisy result set. Therefore, with the relevancy expectation score, the user may indicate how noisy the result set should be.

The search module 204 is configured to search the database 104 against the search query provided by the user, and output an original list of results, where each result has a respective numerical score, and the results may be sorted according to respective numerical scores. As an example, numerical scores are based on term frequencies (tf) and inverse document frequencies (idf). The search module 204 orders the result set by relevance in decreasing order. In an embodiment, the user may input a text query for searching one or more documents in the database 104 and the search module 204 may search an internal document index and return one or more documents arranged in decreasing order of relevance according to the respective numerical scores.

The post-processing module 206 is configured to perform post-processing of the numerical scores of the results of the original list, wherein the post-processing includes relevancy expectation score transformation, determining a volume regulation function, and cut-off score estimation.

The result set filtering module 208 filters the results of the original list based on the cut-off score, i.e., the result set filtering module 208 generates those results of the original list that have a numerical score greater than or equal to the cut-off score.

In an embodiment, the result set filtering module 208 calculates a fall-back method to determine the optimal number of results n to return if less than M results are returned in the original result list of length N. This fall-back method acts as a quality safe-guard to prevent an undesired cut-off score estimation due to over-fitting of the linear regression solution. This situation arises if less than M results are returned in the original result list. The fall-back method is calculated as a quadratic function of the relevancy expectation score $r_e$ and returns a number of items n. Moreover a minimum number of items to return $n_{min}$ is provided to the method.

$$n = n_{min} + (N - n_{min}) * (1 - r_e)^2 \tag{1}$$

The final number of results is calculated using:

$$n = \max(n_{min}, \text{ceil}(n)) \tag{2}$$

Example I

Total number of results N in the original result list=15
Minimal required number of results for volume regulation function M=50
User relevancy expectation score $r_e$=0.2
Minimal required number of results to return $i_{min}$=5
Number of results to return i=max(5, ceil(5+(15-5)*(1-0.2)$^2$))=12

The result set sorting module 210 sorts the filtered results based on respective timestamps, for providing the user with a more natural way to consume results, as humans tend to favour recent results over old ones.

The output module 212 displays the sorted list of results on a display of the user device 106a.

FIG. 2 is merely an example. One of ordinary skill in the art would recognize many variations, alternatives, and modifications of embodiments herein.

Figure 3:
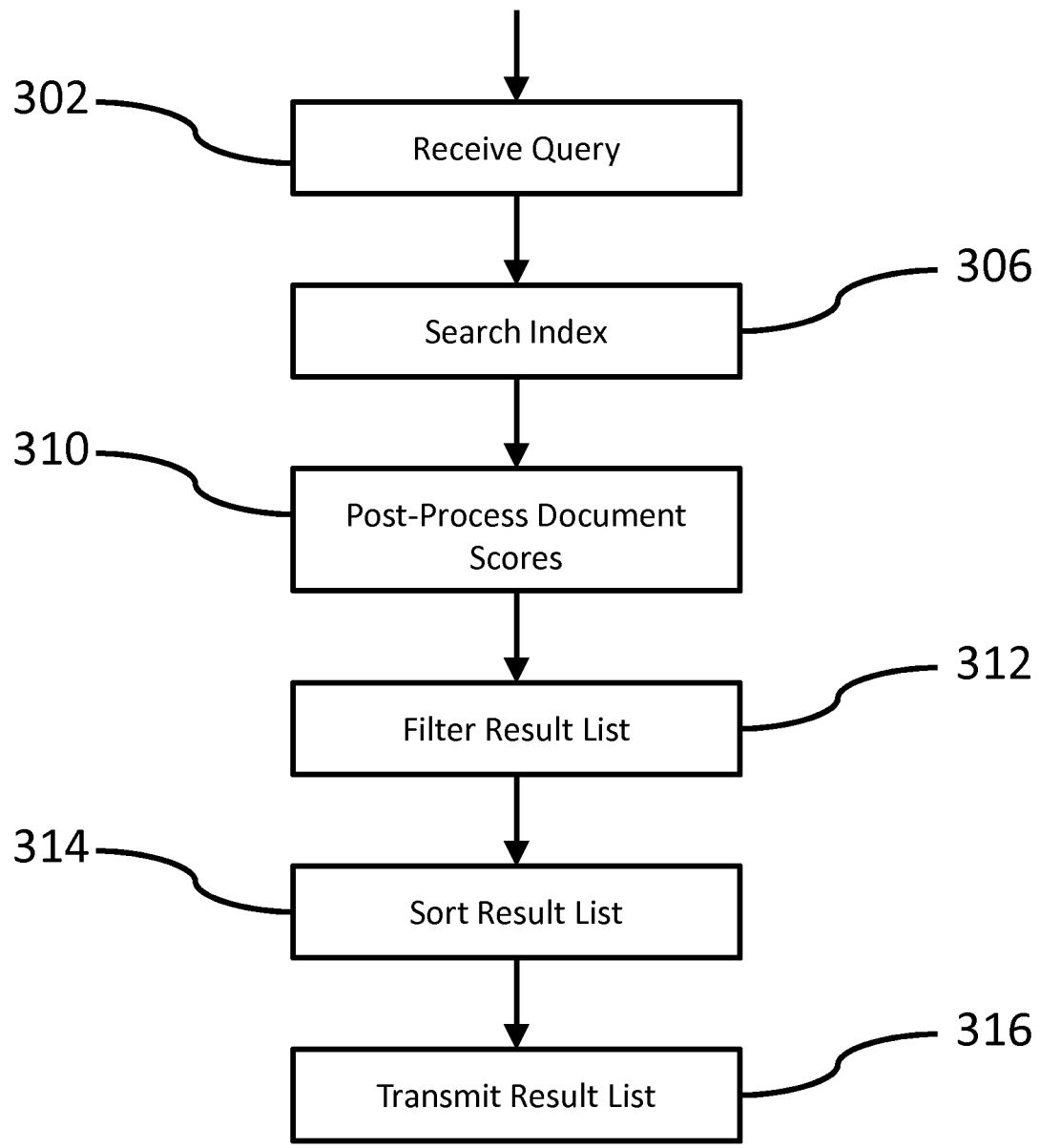
FIG. 3 is a schematic illustration of processing a search query by the information retrieval system, in accordance with an embodiment of the present disclosure.

FIG. 3 is a schematic illustration of processing a search query by the information retrieval system 102, in accordance with an embodiment of the present disclosure. At step 302, the receiving module 202 receives a search query from a user device 106a. In an embodiment, the user inputs the search query in a search field on a web page displayed on the user device 106a. At step 306, the search module 204 searches an internal document index, of which database 104 is an example, and obtains an original list of results/documents and their respective scores. At step 310, the post-processing module 206 performs post-processing of the document scores based on a relevancy expectation score and total number of results obtained from the user search query.

The post-processing module 206 is configured to perform post-processing of the numerical scores of the results contained in the original list of length N in accordance with an action 310, wherein the post-processing includes transforming relevancy expectation score $r_e$, determining a volume regulation function, and estimating a cut-off score. The relevancy expectation score is transformed with the polynomial function $$f(r_e,N)=(1-r_e)^m \quad (3)$$

where the exponent m is $$\max(1,\text{floor}(\log_{10}(N))) \quad (4)$$

The resulting order of the polynomial function depends on the total number of results N obtained in the original list. In an example, the order is increased for each order of magnitude of the total number of results (linear transformation for up to 100, quadratic transformation for up to 1000, etc.). This is similar to a logarithmic potentiometer which is used to control the volume on audio equipment. The resulting behaviour feels more natural as human perception of audio volume is not linear but logarithmic.

The post-processing module 206 determines a volume regulation function by fitting a natural language specific distribution to the numerical scores of the original list. To control the quality of the volume regulation function, only the sub-set of the first M results of the result set is used for this process. In an embodiment, when the search module 204 returns a list of documents against a text query, a natural language specific distribution such as a Zipf distribution is used to model the volume regulation function. The Zipf distribution estimates the numerical score of a document at a rank $r_i$ using the equation $$\text{score}(r_i)=\alpha*r_i^\beta \quad (5)$$

where α and β are constants and are obtained by solving a regression problem using machine learning techniques.

In an embodiment, the post-processing module 206 solves the regression problem by transforming equation (5) with a logarithmic function. This transformation allows the usage of linear regression to estimate the parameters α and β of equation (5). The general linear regression function to solve is $$y'=B*X+A \quad (6)$$

The logarithmic transformation of equation (5) is further simplified to $$\ln(\text{score}(r_i))=\beta*\ln(r_i)+\ln(\alpha) \quad (7)$$

and the first M ranks and relevancy scores are used as input variables to solve the linear regression.

The post-processing module 206 estimates a cut-off score from a transformed relevancy expectation score and total number of results in the original list, using the transformed relevancy expectation function of equation (3) and (4) and the volume regulation function of equation (5). The cut-off score may be estimated based on the following equation:

$$r_c=\alpha*(N*f(r_e,N))^\beta \quad (8)$$

Example I

Total number of results N in the original result list=120
Polynomial function order m=max(1, floor($\log_{10}$ (120)))=2
User relevancy expectation score $r_e$=0.2
Transformed user relevancy expectation score $(1-r_e)^m$= $0.8^2$=0.64
Cut off score $r_c \approx \alpha*(120*0.8^2)^\beta$.

Example II

Total number of results N in the original result list=1200
Polynomial function order m=max(1, floor($\log_{10}$ (1200)))=3
User relevancy expectation score $r_e$=0.9
Transformed user relevancy expectation score $(1-r_e)^m$= $0.1^3$=0.001
Cut off score $r_c \approx \alpha*(1200*0.1^3)^\beta$.

In an embodiment, the post-processing module 206 optionally defines a pre-calculated minimal score $r_m$ to cap the cut-off score $r_c$ using the following equation:

$$r_c'=\min(r_c,r_m) \quad (9)$$

The minimal score $r_m$ can be estimated by using the original relevancy score of a reference document judged by the user as a valuable document for this information need.

Example I

Total number of results N in the original result list=120
Polynomial function order m=max(1, floor($\log_{10}$ (120)))=2
User relevancy expectation score $r_e$=0.2
Transformed user relevancy expectation score $(1-r_e)^m$= $0.8^2$=0.64
Pre-calculated minimal score $r_m$=0.05
Cut off score $r_c'=\min(\alpha*(120*0.2^2)^\beta, 0.05)$ As a result, the post-processing module 206 does not let the cut off score exceed the pre-calculated minimal score.

Figure 9:
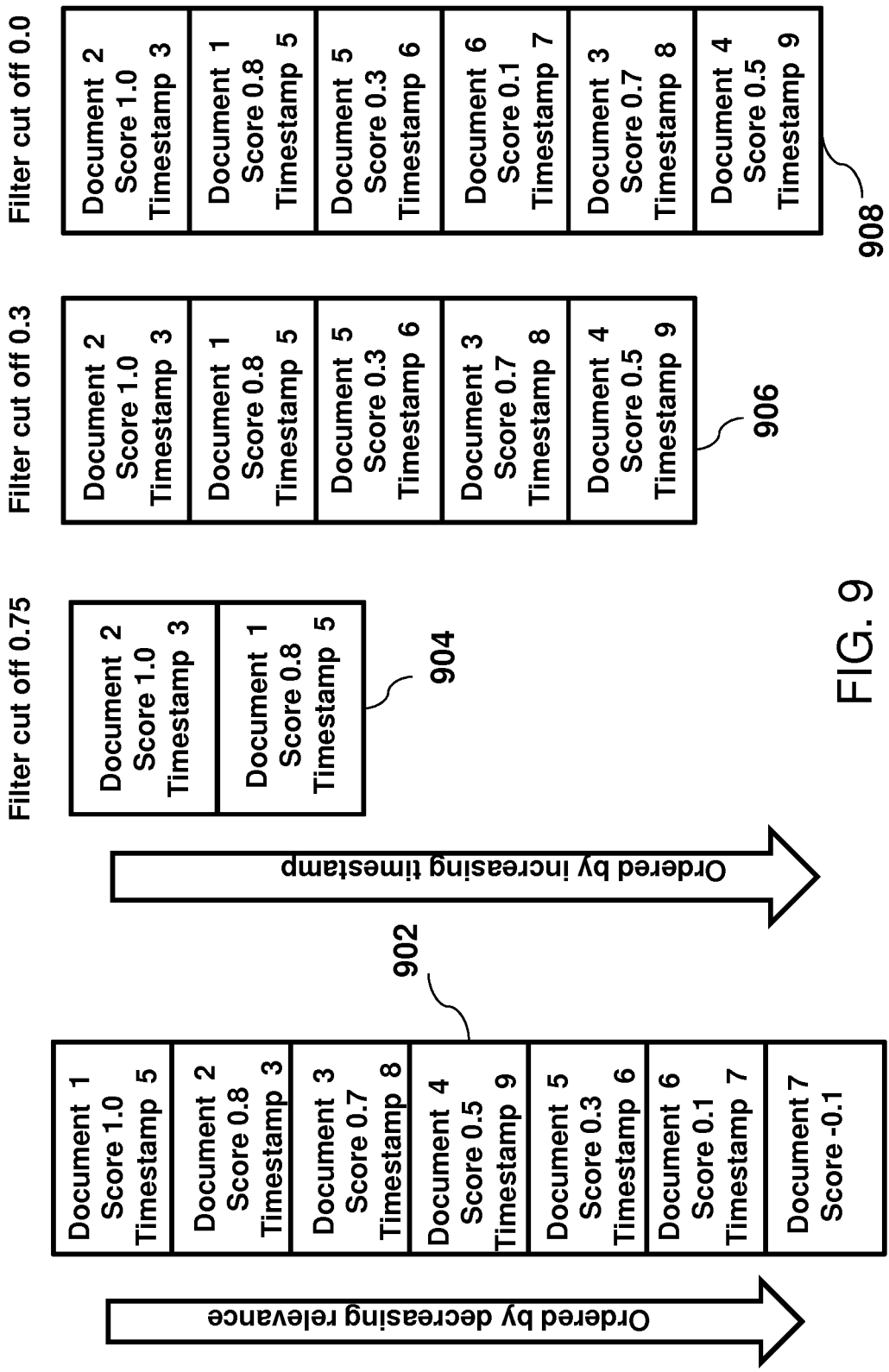
FIG. 9 schematically illustrates a list of search results generated by the information retrieval system, in accordance with an embodiment of the present disclosure.

At step 312, the result set filtering module 208 filters the original results list based on a cut-off score, i.e., the result set filtering module 208 generates only those results of the original list that have a score greater than or equal to the cut-off score. At step 314, the result set sorting module 210 sorts the filtered results based on respective timestamps (FIG. 9). At step 316, the output module 212 transmits the sorted list of results to the user device 106a, and at step 318, the user device 106a receives and displays the sorted list of results on a respective display.

Figure 4:
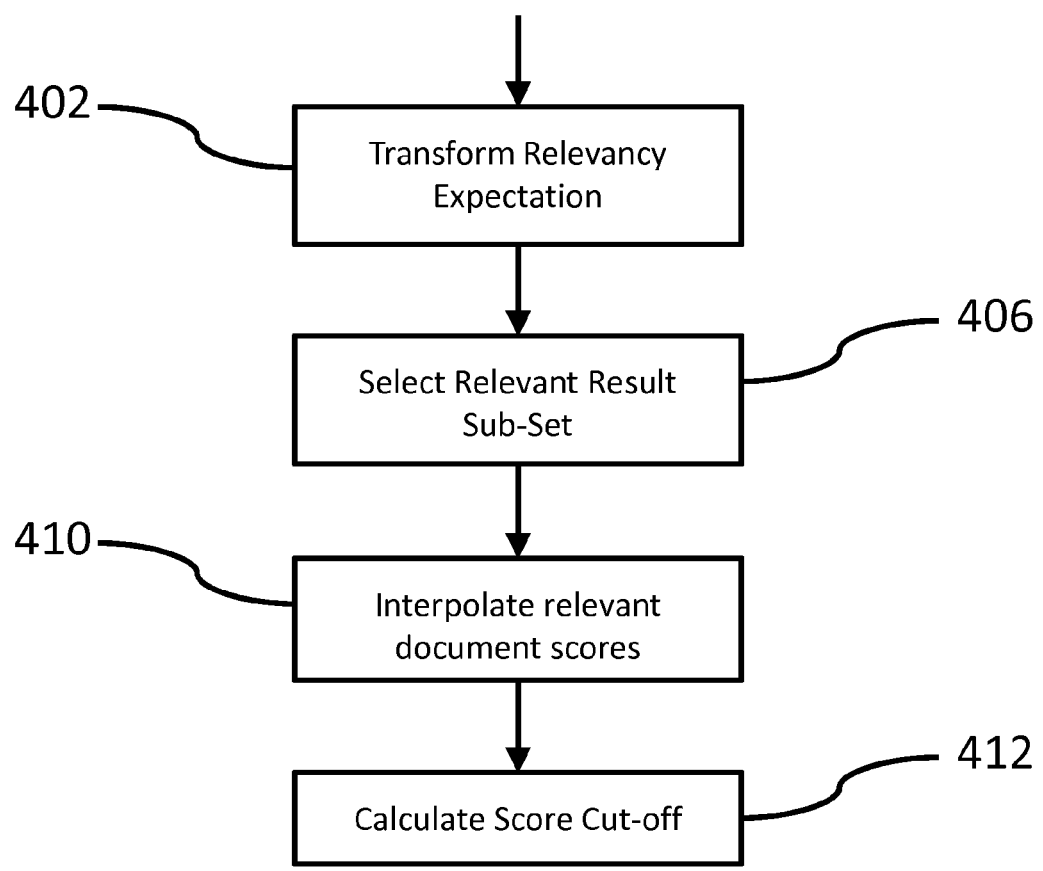
FIG. 4 is a schematic illustration of post processing of the document scores by the post-processing module, in accordance with an embodiment of the present disclosure.

FIG. 4 is a schematic illustration of post-processing of the document scores by the post-processing module 206, in accordance with an embodiment of the present disclosure. At step 402, the post-processing module 206 receives and transforms a relevancy expectation score with a polynomial function; at step 406, selects a sub-set of the original result list that includes relevant results; at step 410, interpolates scores of the sub-set of the original result list; and at step 412, calculates a cut-off score using the equations (4) and (5).

Figure 5:
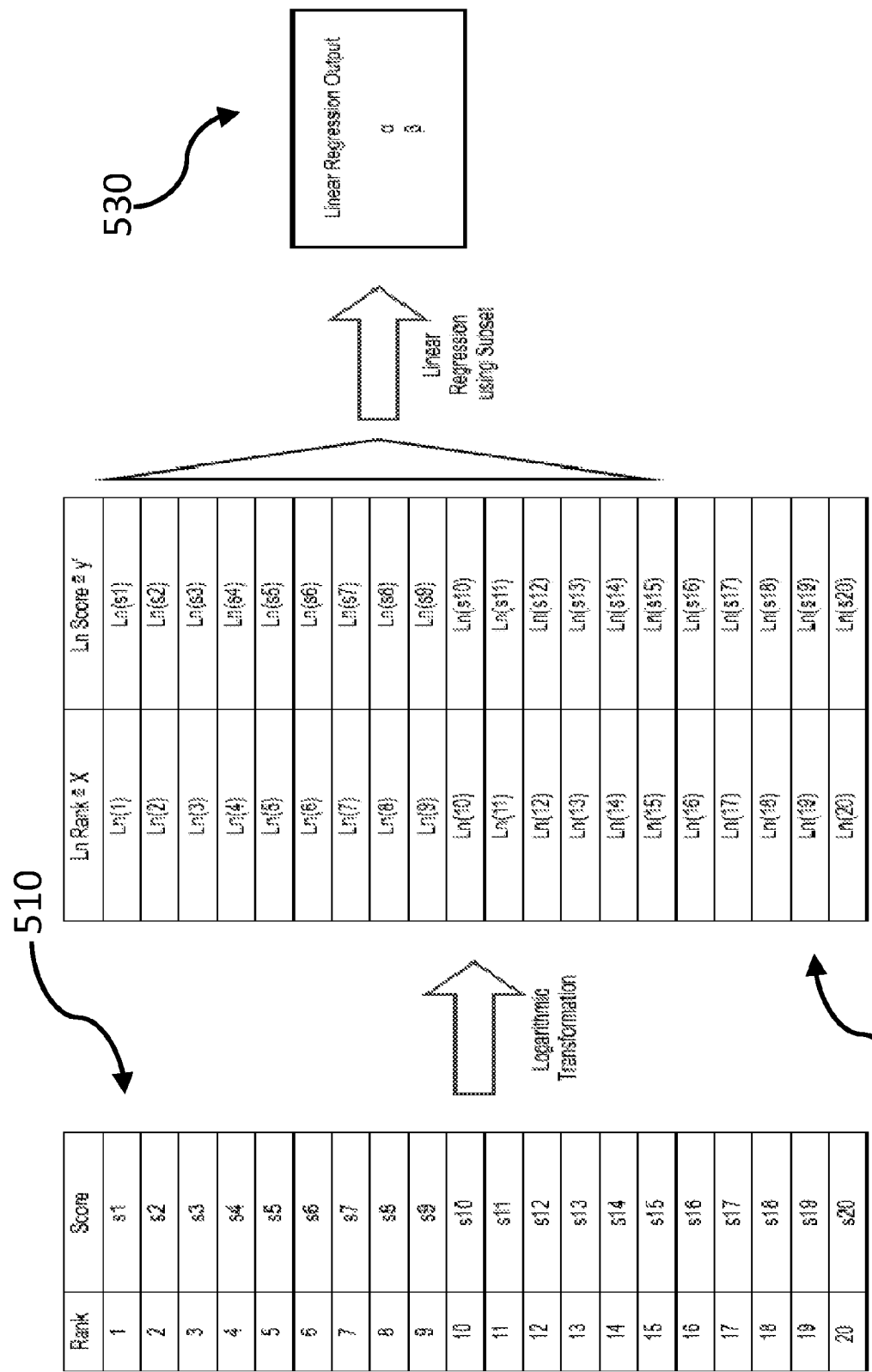
FIG. 5 illustrates an example determination of a volume regulation function by the post-processing module, in accordance with an embodiment of the present disclosure.

FIG. 5 is an exemplary determination of a volume regulation function by the post-processing module. A first table 510 lists the relevancy scores for each of the N resulting documents as calculated by the search system. With a logarithmic transformation both the ranks and the scores are transformed (table 520) as a preparation for the linear regression fitting applied on the first M results of the list. The resulting parameters 530 ($\alpha$ and $\beta$) from the regression are then used to calculate the cut-off score based on the relevancy expectation score.

Figure 6:
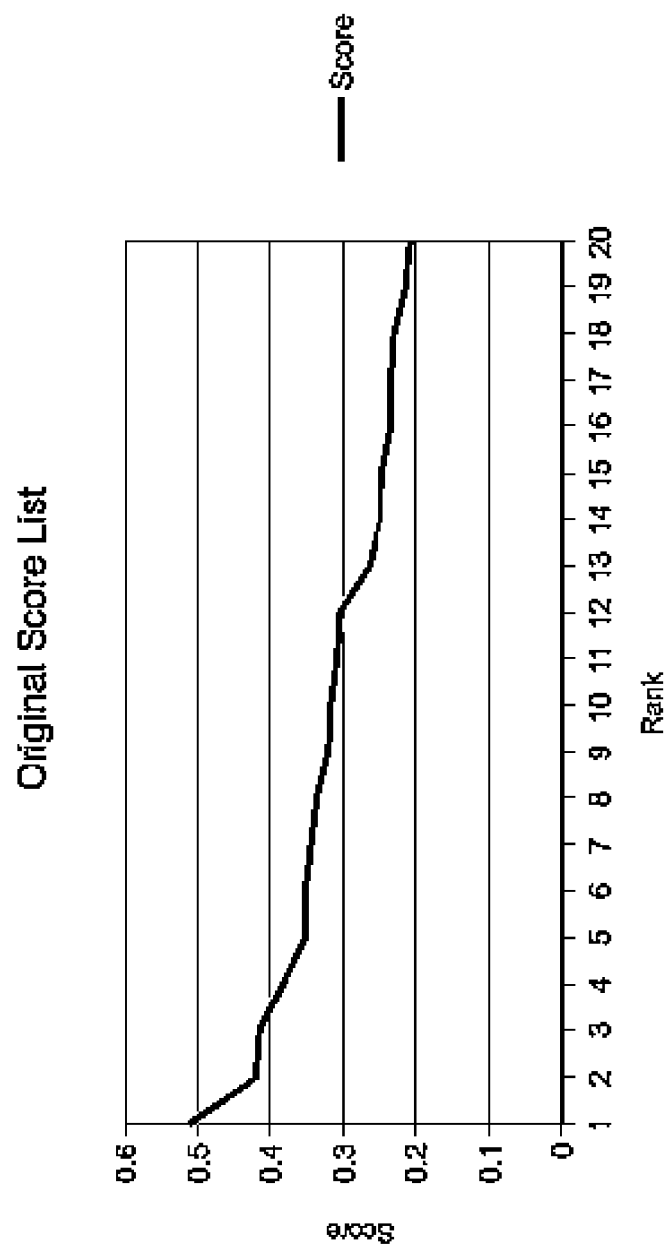
FIG. 6 illustrates an example of an original score list as received by the post-processing module, in accordance with an embodiment of the present disclosure.

FIG. 6 is an exemplary illustration of an original score list graph as received by the post-processing module. The original score list graph shows the distribution of the original relevancy score as calculated by the search system over the resulting ranks.

Figure 7:
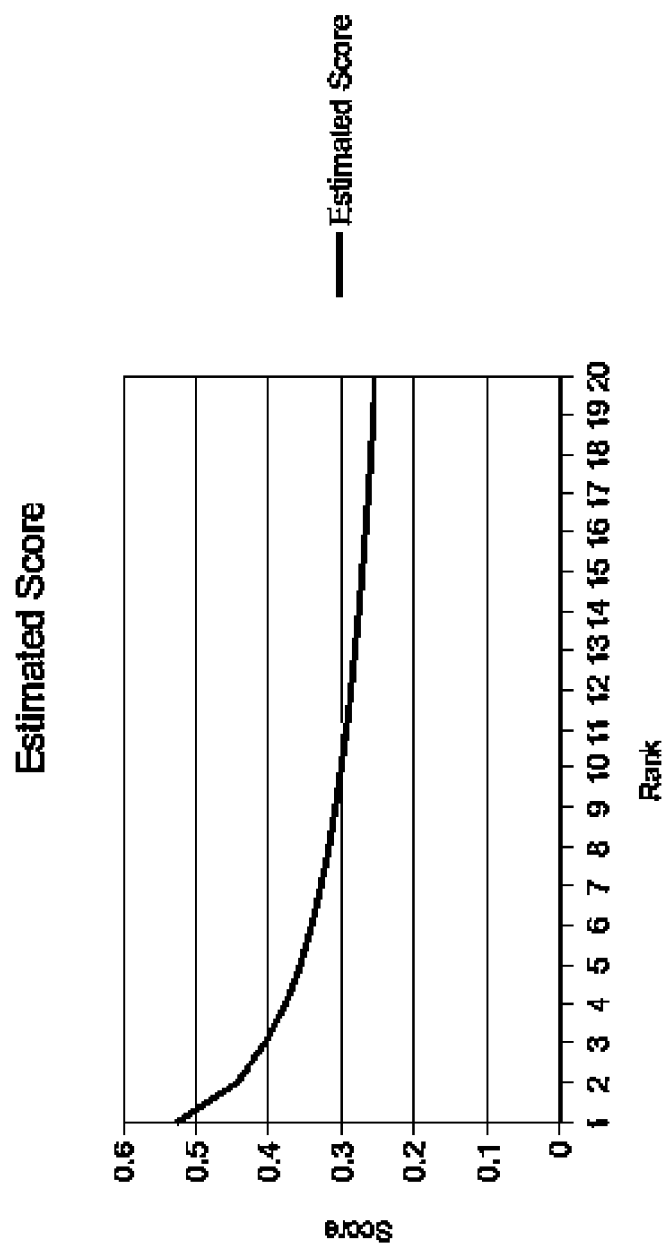
FIG. 7 illustrates an example of an estimated score function determined by the post-processing module, in accordance with an embodiment of the present disclosure.

FIG. 7 is an exemplary illustration of an estimated score function determined by the post-processing module. The estimated score graph demonstrates the solution of the linear regression for the result set from FIG. 6.

Figure 8:
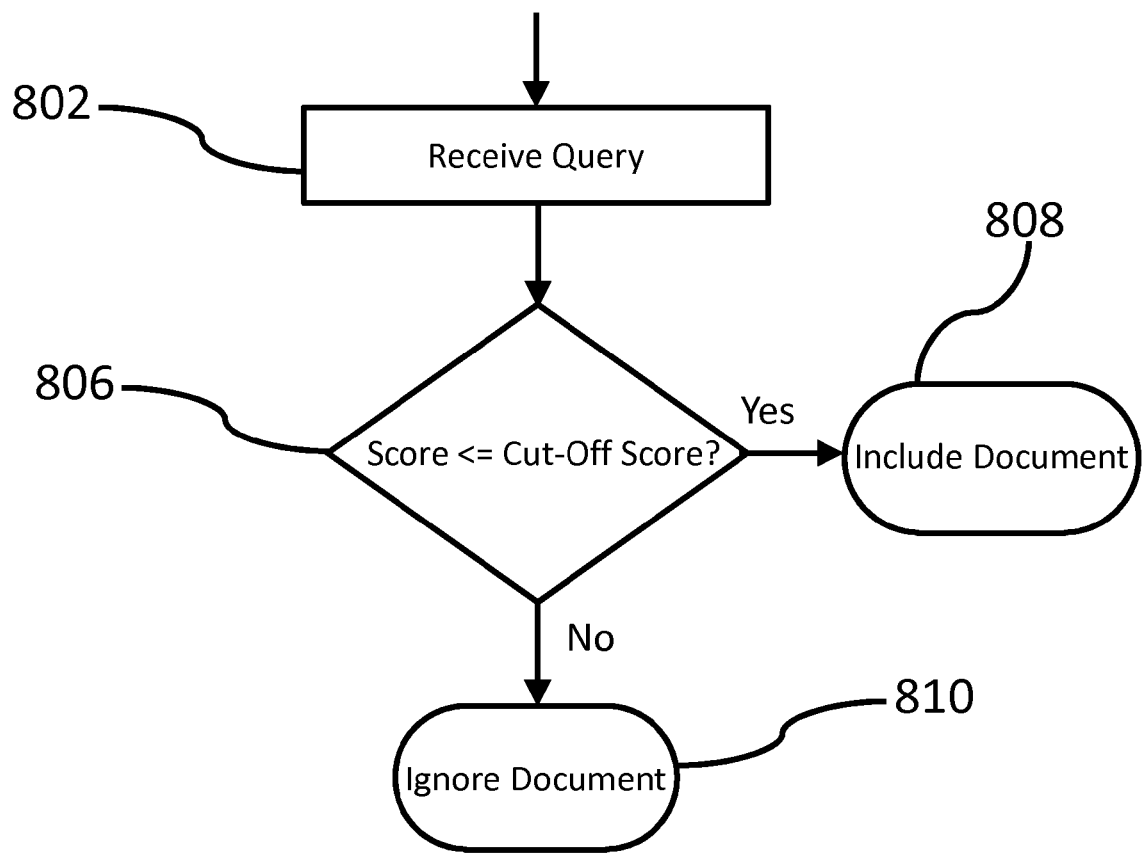
FIG. 8 illustrates filtering of the results by the result set filtering module, in accordance with an embodiment of the present disclosure.

FIG. 8 is an illustration of filtering of the results by the result set filtering module 208, in accordance with an embodiment of the present disclosure. At step 802, the result set filtering module 208 extracts a numerical score of a document/result of the original result list and at step 806, it checks whether the numerical score is greater than or equal to the cut-off score. At step 808, the result set filtering module 208 includes/retains the document/result when the numerical score is greater than or equal to the cut-off score. Alternatively, the result set filtering module 208 ignores the document at step 810 when the numerical score is less than the cut-off score. The result set filtering module 208 repeats the steps 802 to 810 for the remaining documents of the original result list.

FIG. 8 is merely an example. One of ordinary skill in the art would recognize many variations, alternatives, and modifications of embodiments herein.

FIG. 9 is a schematic illustration of an original result list 902 and first through third filtered results lists 904, 906 and 908 in accordance with an embodiment of the present disclosure. The original result list 902, which is an example of the original result list referred to above, is generated based on the search query input by the user and includes seven documents arranged in order of decreasing relevance. Each document of the original list 902 has a score and timestamp associated therewith. A first filtered list 904 is obtained by filtering the original list 902 using a cut-off score of 0.75 and arranging in order of increasing timestamp. A second filtered list 906 is obtained by filtering the original list 902 using a cut-off score of 0.30 and arranging in order of increasing timestamp. A third filtered list 908 is obtained by filtering the original list 902 using a cut-off score of 0.00 and arranging in order of increasing timestamp.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An information retrieval system, wherein the information retrieval system includes computing hardware which is operable to execute one or more software products recorded on machine-readable data storage media and is operable to:
   receive from a user device, a search query and a corresponding relevancy expectation score;
   search a database against the search query and generate a first list of one or more results, wherein each result of the first list has a numeric score associated therewith;
   transform the relevancy expectation score with a polynomial function, wherein the order of the polynomial function depends on the number of results in the first list;
   determine a volume regulation function by fitting a natural language specific distribution to the numeric scores of the one or more results of the first list;
   estimate a cut-off score from a transformed relevancy expectation score and total number of results in the first list, using the determined volume regulation function; and
   generate a filtered list based on the cut-off score, wherein the filtered list includes one or more results of the first list that have a numeric score greater than or equal to the cut-off score.

2. The information retrieval system as set forth in claim 1, wherein the computing hardware is further operable to apply a fall-back method to calculate the result set size based on a relevancy expectation value and the original result set size.

3. The information retrieval system as set forth in claim 1, wherein the computing hardware is further operable to cap the cut-off score using a pre-calculated minimal score.

4. The information retrieval system as set forth in claim 1, wherein the computing hardware is further operable to use a sub-set of the first list for computing the cut-off score, wherein the sub-set includes one or more relevant results.

5. The information retrieval system as set forth in claim 1, wherein the computing hardware is further operable to sort one or more results of the filtered list according to respective timestamps.

6. The information retrieval system as set forth in claim 1, wherein the user device is implemented using at least one of: a personal computer, a laptop, a personal digital assistant, a tablet, a phablet, a webpad, a wearable computer, a mobile telephone, a wrist-worn computer, and a smart phone.

7. A computer implemented method of varying result set size during information retrieval based upon user expectations, comprising:
   receiving a search query and a corresponding relevancy expectation score from a user device;
   searching a database against the received search query;
   generating a first list of one or more results, wherein each result of the first list has a numeric score associated therewith;
   transforming the relevancy expectation score with a polynomial function, wherein the order of the polynomial function depends on the number of results in the first list;
   fitting a natural language specific distribution to the numeric scores of the one or more results of the first list to determine a volume regulation function;

using the determined volume regulation function to estimate a cut-off score from the transformed relevancy expectation score and the total number of results in the first list; and generating a filtered list including results of the first list having a numeric score greater than or equal to the cut-off score.

8. The computer-implemented method as set forth in claim 7, further comprising applying a fall-back method to calculate a result set size based on a relevancy expectation value and the original result set size.

9. The computer-implemented method as set forth in claim 7, further comprising capping the cut-off score using a pre-calculated minimal score.

10. The computer-implemented method as set forth in claim 7, further comprising computing the cut-off score with a sub-set of the first list, wherein the sub-set includes one or more relevant results.

11. The computer-implemented method as set forth in claim 7, further comprising sorting one or more results of the filtered list according to respective timestamps.

12. The computer-implemented method as set forth in claim 7, wherein receiving a search query and a corresponding relevancy expectation score from a user device further comprises receiving a search query from at least one of: a personal computer, a laptop, a personal digital assistant, a tablet, a phablet, a webpad, a wearable computer, a mobile telephone, a wrist-worn computer, and a smart phone.

13. An information retrieval system, comprising:
computing hardware;
a database operatively coupled with the computing hardware and including documents for delivery to a user in response to a user search; and
a non-transitory, computer-readable memory component operatively coupled with the computing hardware and further including:
a receiving module configured to, upon actuation by the computing hardware, receive a search query and a corresponding relevancy expectation score from the user;
a search module configured to, upon actuation by the computing hardware, search the database against the search query provided by the user and output an original list of results each of which exhibits a numerical score; and
a post-processing module configured to, upon actuation by the computing hardware, perform post-processing of the numerical scores of the results of the original list including relevancy expectation score transformation, volume regulation function determination and cut-off score estimation.

14. The information retrieval system as set forth in claim 13, further comprising a result set filtering module configured to, upon actuation by the computing hardware, filter the results of the original list based on the cut-off score.

15. The information retrieval system as set forth in claim 14, further comprising a result set sorting module configured to, upon actuation by the computing hardware, sort the filtered results based on respective timestamps.

16. The information retrieval system as set forth in claim 15, further comprising an output module configured to, upon actuation by the computing hardware, transmit the sorted list of results to the user.

* * * * *